(12) United States Patent
Howington

(10) Patent No.: US 9,741,328 B2
(45) Date of Patent: Aug. 22, 2017

(54) APPARATUS FOR VARYING THE PITCH OF AUDIBLE TONES DRIVEN BY A TURNTABLE

(71) Applicant: Daniel J. Howington, Denton, TX (US)

(72) Inventor: Daniel J. Howington, Denton, TX (US)

( * ) Notice: Subject to any disclaimer, the term of this patent is extended or adjusted under 35 U.S.C. 154(b) by 0 days.

(21) Appl. No.: 14/998,546

(22) Filed: Jan. 20, 2016

(65) Prior Publication Data

US 2017/0206880 A1    Jul. 20, 2017

(51) Int. Cl.
| | | |
|---|---|---|
| *G10H 3/14* | (2006.01) |
| *G10H 5/02* | (2006.01) |
| *H04R 17/04* | (2006.01) |
| *G11B 3/08* | (2006.01) |
| *G11B 17/08* | (2006.01) |
| *G11B 17/16* | (2006.01) |
| *G11B 3/085* | (2006.01) |

(52) U.S. Cl.
CPC ............ *G10H 3/143* (2013.01); *G10H 5/02* (2013.01); *G11B 3/08* (2013.01); *G11B 3/085* (2013.01); *G11B 17/08* (2013.01); *G11B 17/16* (2013.01); *H04R 17/04* (2013.01)

(58) Field of Classification Search
CPC .......... G10H 3/143; G10H 5/02; H04R 17/04; G11B 3/08; G11B 3/085; G11B 17/08; G11B 17/16
USPC .......................................................... 84/672
See application file for complete search history.

(56) References Cited

U.S. PATENT DOCUMENTS

| 2,823,039 | A | * | 2/1958 | Collaro | G11B 17/165 369/186 |
| 3,051,494 | A | * | 8/1962 | Walton | F16C 32/00 369/245 |
| 3,516,677 | A | * | 6/1970 | Humby | G11B 3/08 369/216 |
| 3,625,520 | A | * | 12/1971 | Say | 369/217 |
| 3,625,521 | A | * | 12/1971 | Caddy | G11B 17/08 369/206 |
| 3,625,522 | A | * | 12/1971 | Humby | G11B 3/08 369/210 |
| 3,645,541 | A | * | 2/1972 | Robertson-Aikman | G11B 3/20 369/252 |
| 3,743,395 | A | * | 7/1973 | Preuss | H04N 5/85 352/103 |
| 3,814,442 | A | * | 6/1974 | Van Antwerp | G11B 17/16 369/184 |
| 3,848,875 | A | * | 11/1974 | Miyoshi | G11B 3/085 369/203 |

(Continued)

*Primary Examiner* — David Warren
*Assistant Examiner* — Christina Schreiber
(74) *Attorney, Agent, or Firm* — David G. Moore

(57) ABSTRACT

A musical instrument adapted for use with a turntable. Said apparatus uses a rotary pulse generator to create musical tones when in contact with the rotating platter of the turntable. Said apparatus mounts to the turntable in such a way that a rotary pulse generator rotates when in contact with the rotating turntable platter. As the radius at which the rotary pulse generator contacts the turntable platter is increased the frequency of the tone produced increases proportionally, likewise when the radius at which the rotary pulse generator contacts the turntable platter is decreased the frequency of the tone produced decreases proportionally allowing a range of pitches to be sounded.

2 Claims, 2 Drawing Sheets

(56) References Cited

U.S. PATENT DOCUMENTS

| | | | | | |
|---|---|---|---|---|---|
| 3,850,435 | A | * | 11/1974 | Birch | G11B 3/38 369/220 |
| 3,885,798 | A | * | 5/1975 | Yokokura | G11B 3/08 369/226 |
| 3,991,284 | A | * | 11/1976 | Braun | H04R 1/18 369/139 |
| 4,004,816 | A | * | 1/1977 | Guha | G11B 3/0955 369/182 |
| 4,007,939 | A | * | 2/1977 | Iyeta | G11B 3/0859 369/249.1 |
| 4,027,887 | A | * | 6/1977 | Watanabe | G11B 3/0952 369/65 |
| 4,134,593 | A | * | 1/1979 | Hiramatsu | G11B 3/08512 369/216 |
| 4,138,122 | A | * | 2/1979 | Nakatsuka | H04R 1/16 369/139 |
| 4,143,879 | A | * | 3/1979 | Wren | G11B 3/127 369/242 |
| 4,184,687 | A | * | 1/1980 | Wren | G11B 3/08512 318/600 |
| 4,284,279 | A | * | 8/1981 | Mori | G11B 3/31 369/177 |
| 4,535,438 | A | * | 8/1985 | Massarelli | G11B 3/58 369/264 |
| 4,890,276 | A | * | 12/1989 | Ono | G11B 17/043 369/194 |
| 5,798,999 | A | * | 8/1998 | Labinsky | G11B 17/34 360/99.09 |
| 2007/0008868 | A1 | * | 1/2007 | Riggle | G11B 3/00 369/245 |

* cited by examiner

APPARATUS FOR VARYING THE PITCH OF AUDIBLE TONES DRIVEN BY A TURNTABLE

CROSS-REFERENCE TO RELATED APPLICATIONS

This utility patent application seeks priority to and benefit of U.S. Provisional Patent Application No. 62/125,106 filed on Jan. 14, 2015 and which is incorporated by reference as if fully set forth herein.

STATEMENT REGARDING FEDERALLY SPONSORED RESEARCH OR DEVELOPMENT

No part of the invention disclosed herein was the subject of federally sponsored research or development.

THE NAMES OF THE PARTIES TO A JOINT RESEARCH AGREEMENT

Not applicable

REFERENCE TO A SEQUENCE LISTING

Not applicable

BACKGROUND

Field

The field of the invention is a musical instrument adapted for use with a record turntable.

Description of the Prior Art

The primary element of the apparatus disclosed herein is a rotary pulse generator adapted for use as a musical instrument. Rotary pulse generators comprise a rotor and a stator coupled to generate pulses of some type when excited and have been used for countless purposes in past inventions from spark timing in internal combustion engines to generation of digital vector data in the computer mouse. Among these prior inventions there have been some musical instruments such as the Telharmonium and the Tonewheel Organ which both incorporate magnetic rotary pulse generators, also referred to as "dynamos". Optical rotary pulse generators have been incorporated in inventions such as the computer mouse and musical instruments such as the Optigan. Acoustic rotary pulse generators have been incorporated in musical instruments such as the Glass Armonica and the Siren Whistle. The primary feature that differentiates the apparatus described herein from prior musical inventions incorporating rotary pulse generators is that it is adapted to be driven by physically rolling on an external moving body. While this feature distinguishes the apparatus described herein from prior musical instruments incorporating rotary pulse generators, it does not distinguish said apparatus from all prior inventions incorporating rotary pulse generators. The primary feature that distinguishes said apparatus from any prior invention incorporating rotary pulse generators is the adaptation of said apparatus for mounting to a turntable.

BRIEF DESCRIPTION OF THE INVENTION

The apparatus disclosed herein is a means of accurately producing musical tones of any desired pitch class when used with a turntable. The original concept was essentially a miniature phonograph that was driven by rolling on a full sized turntable. This miniature phonograph would mount to, and send audio signals through, the tonearm of the full sized turntable. The problem run into by the inventor was actually manufacturing the appropriate phonograph cylinders to be played on this machine, which would have to be miniature and etched with locked grooves. As a substitute for these tiny records on the early prototypes, the inventor used caps from various bottles and control knobs from various electronics. The reason these items were used was because the ridges that they bear around the edges act as grooves of a record, exciting the contacting needle as they pass. Throughout the development of these prototypes the inventor has constructed needles of many different materials (metal, plastic, wood, cardboard, rubber, felt, leather, etc.) to achieve different timbres. The next prototypes were built using tone wheels and pickups from a tone wheel organ as pulse generators. Said apparatus could conceivably be adapted as a device for controlling digital sound production devices.

BRIEF DESCRIPTION OF THE DRAWINGS

The invention disclosed herein is a musical instrument adapted for use with a record turntable. As shown in FIG. 1 the musical instrument 10 comprises a drive wheel 11, connected to the wheel mount 142 by a drive shaft 110, a pulse inducing wheel-12 also connected to the wheel mount 142 by the drive shaft 110, a pickup 13 and chassis 14. The chassis 14 comprises instrument mount 140, pickup mount 141 hinged horizontally on the instrument mount 140, and wheel mount 142 hinged vertically on the pickup mount 141. The musical instrument 10 further comprises drive wheel bushings 15a (not shown) and 15b, momentary switch 16, and rail apparatus 17. Said rail apparatus 17 comprises rail support 170, magnet 171, and rail 172.

FIG. 2 shows a schematic of the electrical components of an illustrative embodiment of the musical instrument 10 disclosed herein. The electrical components of the musical instrument 10 comprise a pickup 13. The pickup 13 comprises a bar magnet 130, coil 131, and electrically conductive wires 135. The electrical components of the musical instrument 10 further comprise a momentary switch 16. The momentary switch 16 comprises a switch body 160, a switch actuator 162, and switch contacts 163a and 163b. The momentary switch 16 is wired in parallel with the pickup 13 such that when the switch contacts 163a and 163b are closed, an electrical connection between the electrically conductive wires 135 shorts the circuit. The switch contacts 163a and 163b are normally closed such that output signal from the pickup 13 only feeds through the electrically conductive wires 135 when a switch actuator 162 is depressed opening the switch contacts 163a and 163b.

FIG. 3 shows a partially exploded perspective view of an illustrative embodiment of the musical instrument 10 disclosed herein. The musical instrument 10 comprises a drive wheel 11. The drive wheel 11 comprises a drive shaft 110, drive rotor 111 mounted on the driveshaft 110, and tire 112 mounted around outer edge of the drive rotor 111. The musical instrument 10 further comprises a pulse inducing wheel 12. The pulse inducing wheel 12 is also fixed to the drive shaft 110 of the drive wheel 11 and comprises a pulse inducing rotor 120 constructed of ferrous material and containing a plurality of cogs 122 around the outer circumference of the pulse inducing rotor 120. The musical instrument 10 further comprises a pickup 13. The pickup 13 comprises a bar magnet 130, a coil 131 wrapped around the bar magnet 130 at the proximal end of the bar magnet 132. An electrically insulative circuit board 133 is fixed to the bar magnet 130. Electrically conductive terminals 134a and 134b are fixed to the electrically insulative circuit board 133, and electrically conductive wires 135 are electrically connected to the electrically conductive terminals 134a and 134b. The electrically conductive terminals 134a and 134b are also electrically connected to ends of the coil 131. The musical instrument 10 further comprises a chassis 14. The chassis 14 comprises an instrument mount 140, pickup mount 141 hinged horizontally on the instrument mount 140. A wheel mount 142 is hinged vertically on the pickup mount 141, and a spring 143 is mounted between the pickup mount 141 and the wheel mount 142. The instrument mount 140 comprises an instrument mount body 1400, instrument mount apertures 1401a and 1401b adapted to mount the musical instrument 10 to a turntable headshell, 20 and a pickup mount recess 1402. The pickup mount 141 comprises a pickup mount body 1410, an instrument mount recess 1411, pickup mount apertures 1412a and 1412b, wheel mount recesses 1413a and 1413b, hinge recesses 1414a and 1414b, spring eyelet 1415, switch mount apertures 1416a and 1416b, cantilever 1417, thumb aperture 1418, handle 1418a and rail aperture 1419. The wheel mount 142 comprises wheel mount plates 1420a and 1420b, wheel mount apertures 1421a and 1421b, lateral supports 1422a and 1422b, hinge protrusions 1423a and 1423b, and spring eyelet 1424. The musical instrument 10 further comprises a drive wheel bushings 15a and 15b mounted in wheel mount apertures 1421a and 1421b. The musical instrument 10 further comprises a momentary switch 16. The momentary switch 16 comprises a switch body 160, electrically conductive switch terminals 161a and 161b, and switch actuator 162. The switch body 160 comprises threaded mounting apertures 165a and 165b which accept mounting screws 166a and 166b. The electrically conductive switch terminals 161a and 161b are electrically connected to the electrically conductive wires 164. The electrically conductive switch terminals 161a and 161b are also electrically connected to the switch actuator 162 via switch contacts 163a and 163b (not shown in this figure). The musical instrument 10 further comprises a rail apparatus 17. The rail apparatus 17 comprises a rail support 170, magnet 171, and rail 172. The rail support 170 comprises a rail support body 1700, platter spindle recess 1701 and rail socket 1702. The rail 172 comprises a rail support fitting 1720 at the proximal end of the rail 173 and stop 1721 at the distal end of the rail 174.

Figure 1:
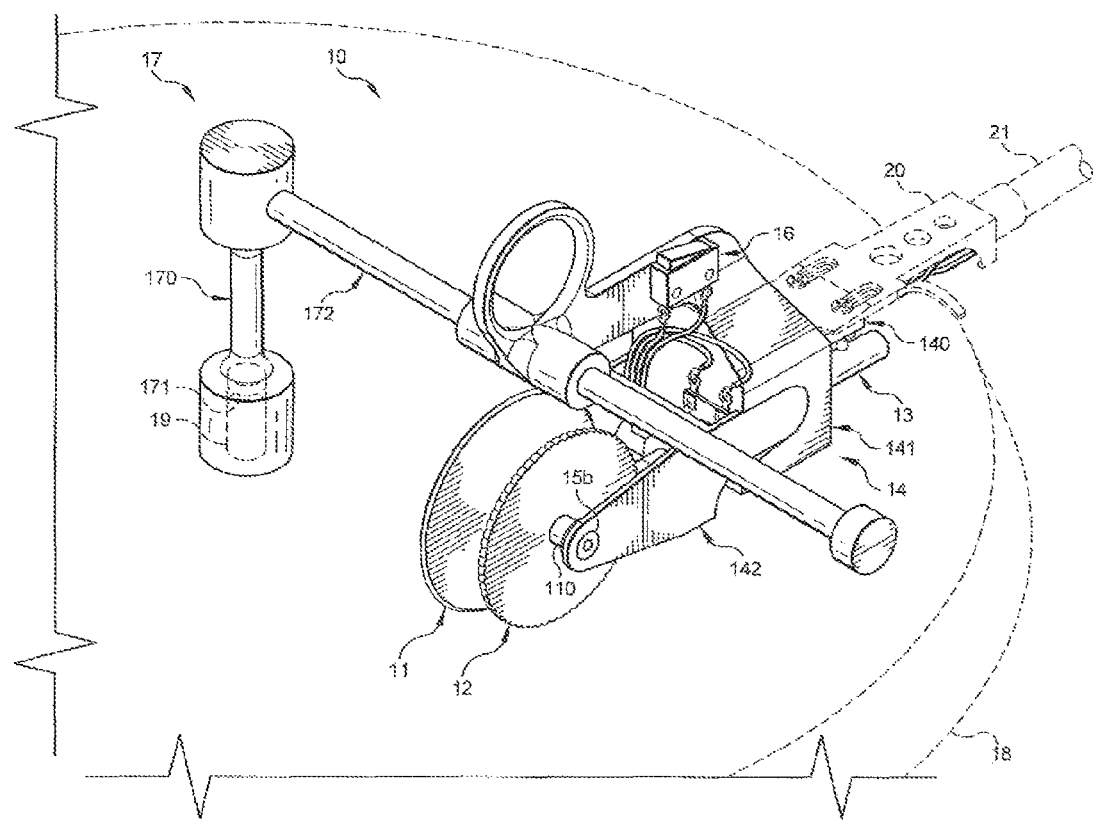
FIG. 1 shows a oblique view the apparatus disclosed herein.
Figure 2:
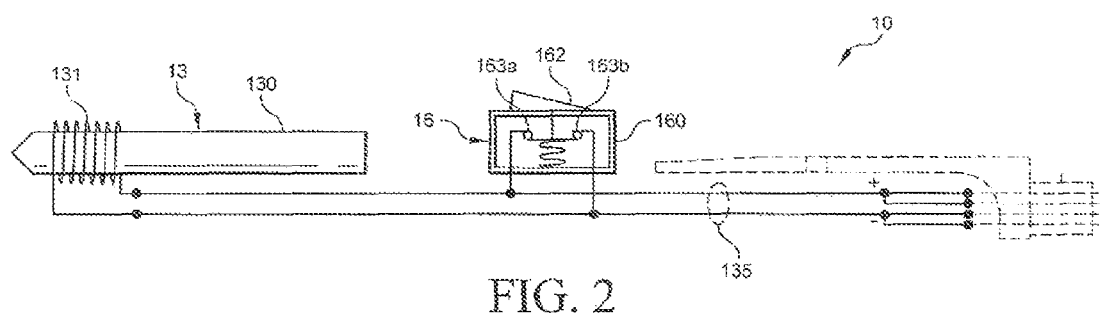
FIG. 2 is a schematic of the electrical connections of apparatus disclosed herein.
Figure 3:
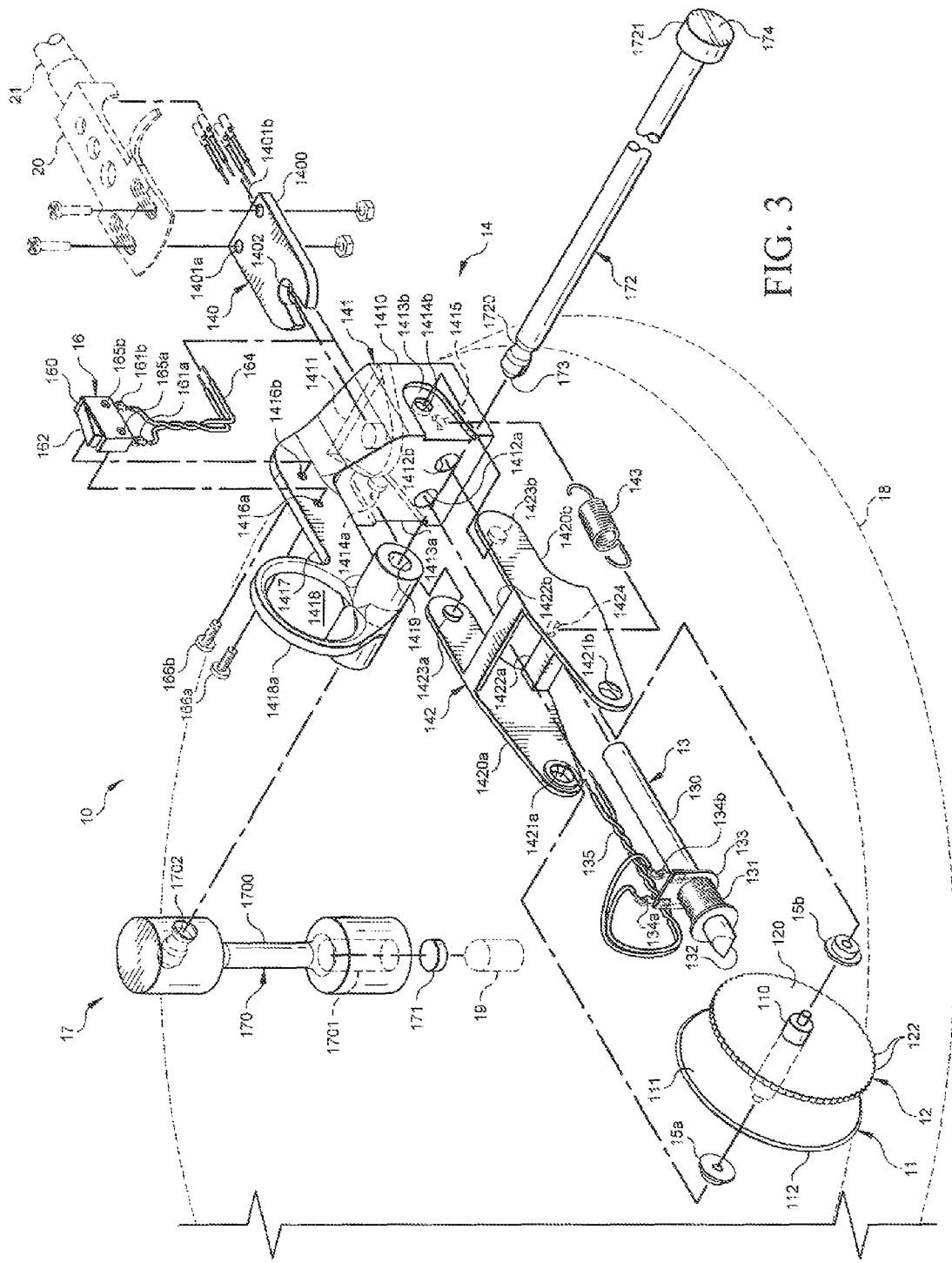
FIG. 3 is a partially exploded view of the apparatus disclosed herein.

The musical instrument 10 which varies the pitch of audible tones driven by a turntable described herein mounts to a standard gramophone headshell 20. The headshell 20 mounts to the gramophone arm 21. The chassis 14 of the musical instrument 10 holds in place a pickup 13 which is wired to the headshell 20 so as to transmit electrical audio signals from the pickup 13 to the gramophone audio outputs. The chassis 14 also holds in place a pulse inducing rotor 120 constructed from ferrous metal and containing a plurality of cogs 122 along the outer circumference of the pulse inducing rotor 120 that is fixed concentrically to a drive shaft 110 and mounted in close proximity to the pickup 13. When the pulse inducing rotor 120 rotates the cogs 122 located at the outer circumference of the pulse inducing rotor 120, the cogs 122 pass by the pickup 13 inducing electrical oscillations in the coil 131 of the pickup 13. When the electrical oscillations are amplified and routed to loudspeakers, audible tones will emerge from the loudspeakers. The tones produced will vary in frequency (pitch) directly based on the rotation speed of the pulse inducing rotor 120. The tones produced will vary in amplitude (loudness) inversely based on the distance between the pulse inducing rotor and the pickup 13. The chassis 14 being mounted to the gramophone arm 21 enables the user to contact the pulse inducing rotor 120 to the rotating gramophone platter 18. The tangential velocity of the rotating gramophone platter 18 will vary depending on the radius at which said tangential velocity is measured. Due to this fact, when the cogs 122 on the pulse inducing rotor 120 contact a record on the rotating gramophone platter 18 at various radii the pulse inducing rotor 120 will rotate at various velocities directly relating to the radii and thus produce various tones with frequencies directly relating to the various velocities. The pulse inducing rotor 120 isn't a perfect circle and as such will not roll smoothly on the gramophone platter 18. Therefore it is necessary to concentrically fix a slightly larger & perfectly circular drive rotor 111 to the drive shaft 110 of the pulse inducing rotor 120 ensuring smoother rotation. The drive rotor 111 is mounted in such a way as to not interfere with the motion of the pulse inducing rotor 120 as the pulse inducing rotor 120 moves more proximal to or distal from the pickup 13. The chassis 14 is divided into three parts: 1) an instrument mount 140, 2) a pickup mount 141, and 3) a wheel mount 142. The instrument mount 140 is attached securely by threaded fasteners to the headshell 20 on its distal end and attached to said pickup mount 141 on its proximal end in such a way as to allow for a horizontal hinging action of pickup mount 141. This horizontal hinging action allows the pickup 13 and wheel mounts 142 to be rotated in order to keep drive wheel 11 in an orientation perpendicular to the gramophone platter 18 radius at all times. The pickup mount 141 is mounted to the instrument mount 140 distal from the operator, and holds the pickup 13 in place, and is attached to said wheel mount 142 on the proximal end from the operator in such a way as to allow for a vertical hinging action of the wheel mount 142. This vertical hinging action allows the pulse inducing rotor's 120 position in relation to the pickup 13 to be adjusted by the user. In addition to the vertical hinging action of the wheel mount 142 in relation to the pickup mount 141, a spring 143 is attached to the pickup mount 141 on end distal to the operator and the wheel mount 142 on proximal end to the operator in order to hold the wheel mount 142 in its most downward position which corresponds to pickup mount 141 being held in its highest position above the rotating platter of the gramophone 18 when the drive wheel 11 is in contact with the rotating platter of gramophone 18 and to the position of the pulse inducing rotor 120 being most distal from the pickup 13. Due to the distal location from pickup 13, the highest position of the pickup mount 141 corresponds to the lowest amplitude (loudness) of the tone being produced. When the user pushes down on a cantilever 1417 that is built into said pickup mount 141 while drive wheel 11 is in contact with the rotating platter of gramophone 123, the wheel mount 142 hinges upward causing the pulse inducing rotor 120 to move more proximal to the pickup 13 and therefore an increase in amplitude (loudness) of tone being produced. An additional feature that is built into the cantilever 1417 of the pickup mount 141 is a rail aperture 1419 positioned directly above the drive wheel 11 thru which a rail 172 may pass. The rail 172 is connected to a rail support 170 at its distal end. The rail support 170 is designed to sit on the gramophone spindle 19 and is held in place with a magnet 171. The rail 172 being constrained by the rail support 170 to the gramophone spindle 19 and being positioned through the rail aperture 1419 in the cantilever 1417 of the pickup mount 141 maintains constant perpendicular orientation of the drive rotor 111 relative to the radius of the gramophone platter 18. In this embodiment, brass bushings 15a, 15b are employed between drive shaft 110 and the wheel mount 142. The bushings 15a, 15b allow for free rotation of the drive shaft 110 and reduce wear due to rotation. A momentary switch 16 is mounted to the pickup mount 141 and wired to the pickup 13 in such a way that when depressed by the user the audio signal circuit is closed allowing tones to be sounded. Pressing the momentary switch 16 by the user sounds a tone, pushing the cantilever 1417 down the user raises the tones volume, and moving the musical instrument 10 toward the center of the gramophone platter 18 by the user lowers the tones pitch.

The musical instrument disclosed herein is readily susceptible to various design and construction variations. By way of example the musical instrument disclosed herein may be constructed with a plurality of pickups, drive wheels, pulse inducing rotors in various combinations. All of those combinations are included within the specification and as further limited by the claims.

I claim:

1. An apparatus driven by the platter of a phonographic turntable with speakers for producing and varying the pitch of audible tones comprising:

a pulse inducing wheel with a pulse inducing rotor containing a plurality of cogs around the circumference of said pulse inducing rotor;

a drive wheel mechanically connected to said pulse inducing wheel;

a pickup mounted proximally to said pulse inducing wheel;

a chassis to which said drive wheel, said pulse inducing wheel, and said pickup are attached;

a rail connected to said phonographic turntable positioned over said platter, running from the center of said platter to the outer edge of said platter and extending through an aperture in said chassis, said chassis being slidable traversable on said rail through said aperture;

whereby as said platter rotates, said drive wheel contacting said platter causes a signal to be generated by said pulse inducing wheel and which is captured by said pickup which transforms said signal into electrical pulses which are converted into audible tones by said speakers associated with said phonographic turntable, the pitch of which may be adjusted by moving said chassis along said rail.

2. An apparatus driven by the platter of a phonographic turntable with speakers for producing and varying the pitch and amplitude of audible tones comprising:

a pulse inducing wheel with a pulse inducing rotor containing a plurality of cogs around the circumference of said pulse inducing rotor;

a drive wheel mechanically connected to said pulse inducing wheel;

a pickup connected by a pickup mount proximally to said pulse inducing wheel;

a hinge located between a pickup mount and wheel mount;

a spring which holds said hinge in an open position;

a depressable handle attached to said pickup mount;

a chassis comprising said pickup mount and said wheel mount and to which said drive wheel, said pulse inducing wheel, said pickup, said hinge, said spring and said depressable handle are attached;

a rail connected to said phonographic turntable positioned over said platter, running from the center of said platter to the outer edge of said platter and extending through an aperture in said chassis, said chassis being slidably traversable on said rail through said aperture;

whereby as said platter rotates, said drive wheel contacting said platter causes a signal to be generated by said pulse inducing wheel and which is captured by said pickup which transforms said signal into electrical pulses which are converted into audible tones by said speakers associated with said phonographic turntable the pitch of which may be adjusted by moving said chassis along said rail, and the amplitude of which can be adjusted by manipulation of said handle attached to said pickup mount which causes said hinge to close when said handle is depressed thus causing said wheel mount to rotate into a position more proximal to said pickup mount and thus positioning said pulse inducing rotor more proximal to said pickup.

* * * * *